United States Patent
Lee

(10) Patent No.: US 7,796,858 B2
(45) Date of Patent: Sep. 14, 2010

(54) SYSTEM OF MIX MODE MULTIMEDIA PLAYER

(75) Inventor: Scot Lee, Hsin Tien (TW)

(73) Assignee: Via Technologies, Inc., Hsin Tien, Taipei Hsien (TW)

( * ) Notice: Subject to any disclaimer, the term of this patent is extended or adjusted under 35 U.S.C. 154(b) by 992 days.

(21) Appl. No.: 11/186,814

(22) Filed: Jul. 22, 2005

(65) Prior Publication Data
US 2006/0018629 A1 Jan. 26, 2006

(51) Int. Cl.
H04N 5/91 (2006.01)
H04N 7/00 (2006.01)

(52) U.S. Cl. ......................................... 386/68; 386/46

(58) Field of Classification Search .................. 386/39, 386/68, 95–96, 98, 125–126, 46, 1; 715/205–208
See application file for complete search history.

(56) References Cited

U.S. PATENT DOCUMENTS 6,757,483 B1 * 6/2004 Sawabe et al. ............... 386/95
7,394,968 B2 * 7/2008 Watkins ....................... 386/46
2002/0085835 A1 * 7/2002 Zhang et al. ................ 386/124
2003/0012559 A1 * 1/2003 Kusaka et al. ................ 386/98

* cited by examiner

Primary Examiner—Marsha D Banks Harold
Assistant Examiner—Marc Dazenski
(74) Attorney, Agent, or Firm—Thomas, Kayden, Horstemeyer & Risley, LLP

(57) ABSTRACT

A mix mode multimedia player having audio scenery and video scenery thereof being controlled individually comprises a playback manager module, and a presentation engine module. The playback manager module for generating audio-format play list, video-format play list, and audio-video interlaced-format play list according to user settings. The user settings includes a plurality of media file's names that user desires to play. The presentation engine module has an audio scene state machine, and a video scene state machine, wherein the presentation engine module provides corresponding play sequences to the audio scene state machine, and the video scene state machine. Furthermore, the audio scene state machine can thus play the media files with audio format and said video scene state machine can thus play said media files with video format. Accordingly, while the media files with audio format playing is forced to "stop" or "pause", the video scene state machine is not disturbed, while said media files with video format playing be forced to "stop" or "pause", said audio scene state machine is not disturbed.

8 Claims, 3 Drawing Sheets

| Loader job | State | Priority | Examination function |
|---|---|---|---|
| Job request message 1 | Waiting | 1 | X |
| Job request message 2 | Waiting | 2 | X |
| Job request message 3 | Waiting | 3 | Critical |

FIG.3

SYSTEM OF MIX MODE MULTIMEDIA PLAYER

FIELD OF INVENTION

The present invention is related to a multimedia player, particularly, to a mix mode multimedia player which controls audio format files and video format files independently.

BACKGROUND OF THE INVENTION

Post 21-century, our amusements become more variety than ever before. People can acquire information of about scenic spots of historical significance around the whole world scenery or enjoy those pleasured and famous films at home just through a DVD (digital video disc) player. The DVD player plays the discs with extremely high quality to be good to hear and see as you are personally on the scene. People can get certain degree of satisfies on scene organs without going to the theater. Still a further benefit is that you can enjoy any sections in the film repeatedly without any restricts.

Referring to FIG. 1, it shows a basic architecture of a multimedia player. The multimedia player 10 fundamentally includes: a video outputting unit 106 and an audio outputting unit 104. The video outputting unit 106 may be a television set or monitor or any handheld display. The audio outputting unit 104 may be a HI-FI stereo or a 5.1 channel stereo to provide those surround, woofer, or heavy bass stereo effect as on the scene yourself.

User enjoys video and audio contented in the multimedia disc though aforementioned video and audio outputting unit just by operating the playback interface such as remote control 102 or buttons 101 on the control panel.

A typical DVD player usually can play multimedia files in variety formats recorded on multimedia disc such as DVD, VCD, SVCD, CDR, CDRW etc., even file type data such as mpeg, jpeg, mp3, mp4, wav. However, conventional DVD player cannot play video and audio data independently, e.g. it plays those video and audio data by interlaced arrangement. A user cannot let DVD player play those media files with audio format data meanwhile setting those media file with video format data. Nothing to say that settings independently such as stop or pause or forward winding or backward winding to those of audio format data or video format data while the DVD player is playing the scenario.

SUMMARY OF THE INVENTION

A mix mode multimedia player for controlling audio format file and video format file individually comprises a playback manager module, a presentation engine module, a file system module, a playback console, a loader manager module, a parser module, a loader module, a track buffer, a video stream buffer and an audio stream buffer. The playback console is a user interface. User setting his favorite play list according to the file names and file location (Logical Block Addressing, LBA) thereof provided by file system module. Thereafter, the playback manager module generates audio-format play list, video-format play list, and audio-video interlaced-format play list according user settings. The playback manager module then creates an audio and a video file navigator object to proceed playing sequence control individually. The file navigator objects send command messages to the presentation engine module, which include a normal, a video, and an audio scene state machine to generate job request messages. In response of the job request messages, a job loader table having a job loader sequence is generated by the loader manager module according to the priority of the job request messages. The highest priority job will be loaded first to the track buffer thereafter to the corresponding stream buffer waited for decoding and then playing. If data in the stream buffer is critical, an examination function may return to the loader manager module to change the priority of a job request messages The job request message having corresponding data format will be elevate. Once upping one media file (video, or audio) is forced to be stop or pause, the media file data stored in the track buffer 218 can be put to the corresponding stream buffer by parser module 216 so that the other type media file data will not be blocked out.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 illustrates a loader job table in accordance with the present invention.

DETAILED DESCRIPTIONS OF THE INVENTION

The present invention is to provide a mix mode multimedia player of which audio format file and video format file can be played independently or individually according to user settings.

Figure 1:
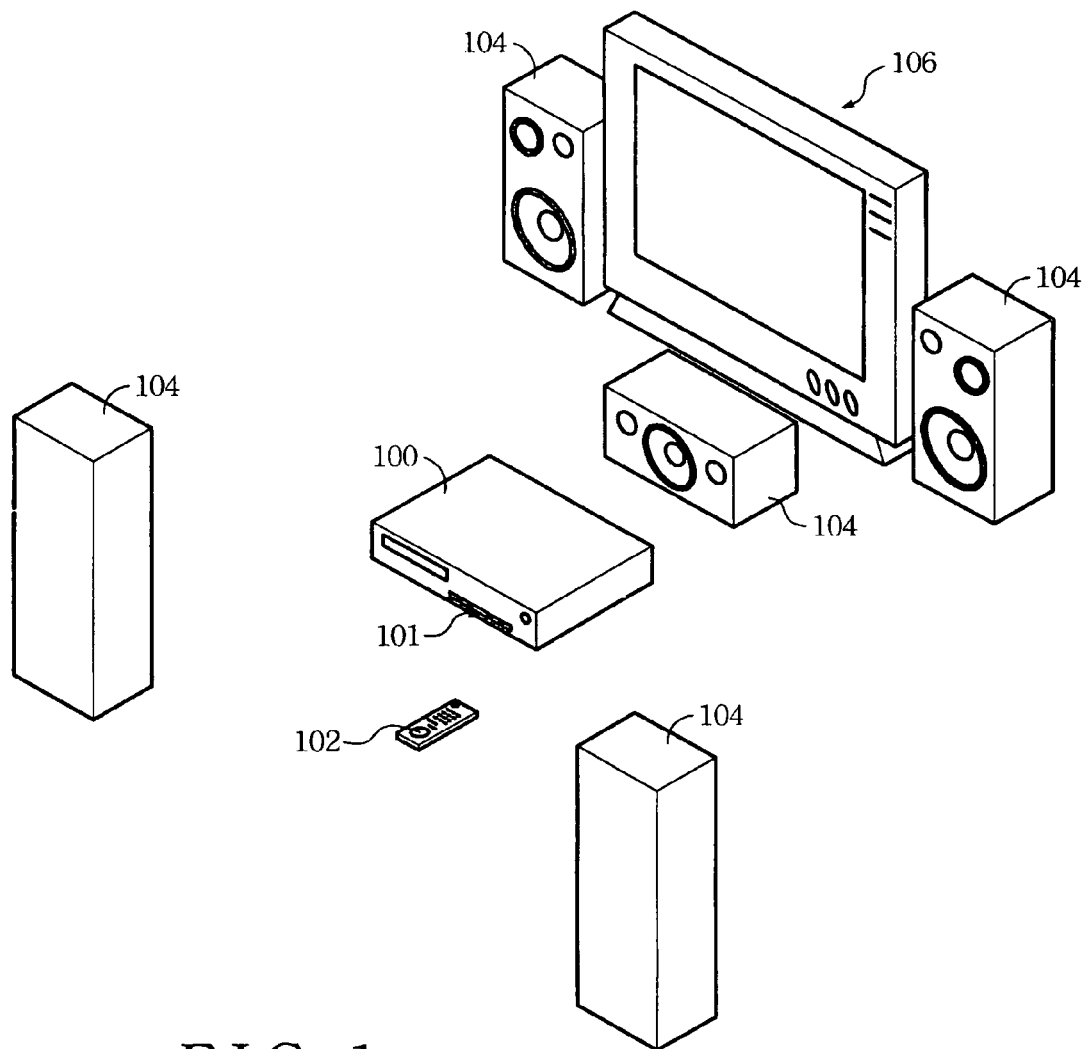
FIG. 1 illustrates a configure diagram of home theater with a multimedia player as a playback unit.
Figure 2:
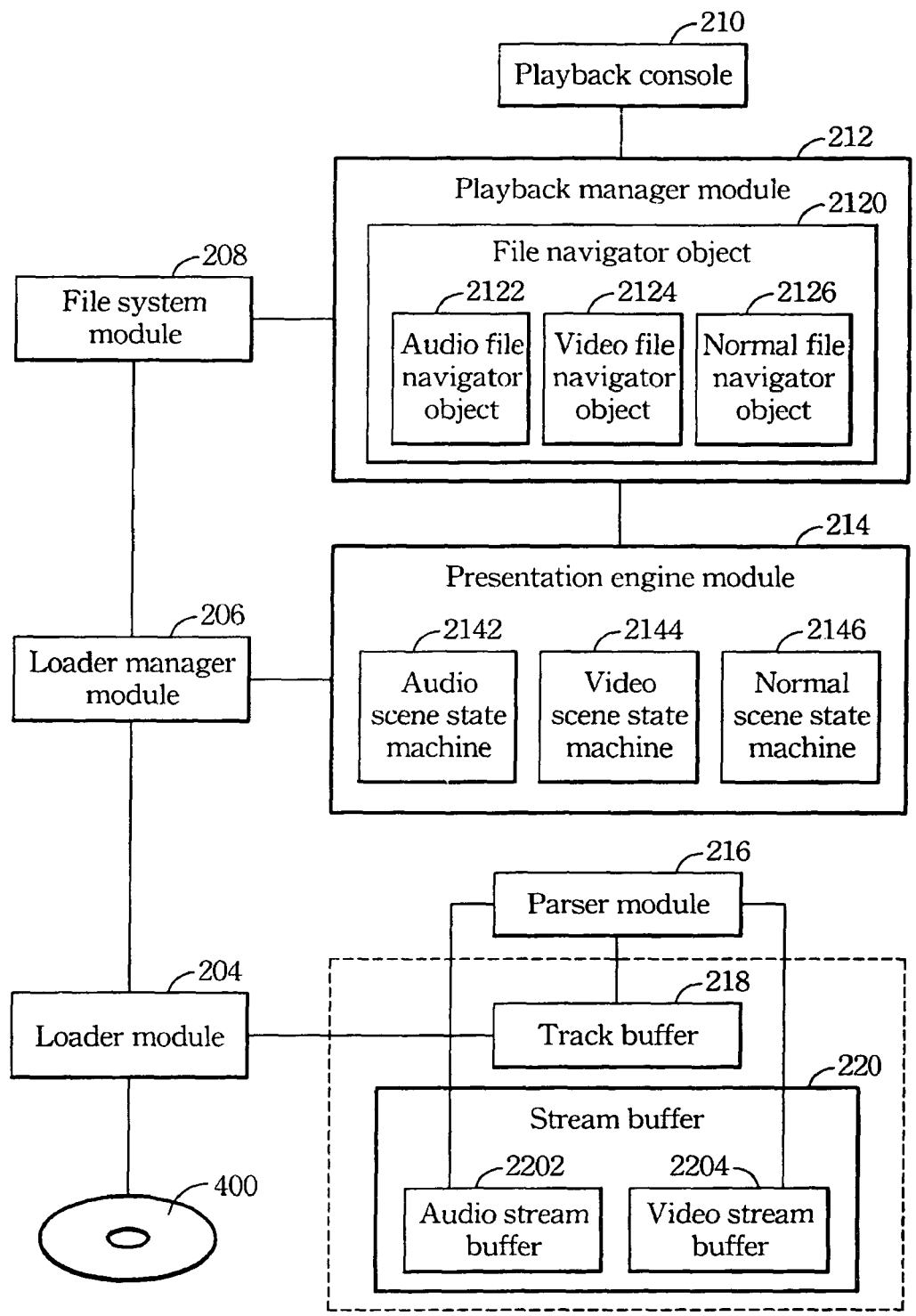
FIG. 2 illustrates function block of multimedia player in accordance with the present invention.

FIG. 2 shows function blocks of a multimedia playback system 200 in accordance with a preferred embodiment of the present invention. The multimedia playback system 200 comprises a loader module 204, a loader manger module 206, a file system module 208, a playback console 210, a playback manger module 212, a presentation engine module 214, a parser module 216, a track buffer 218 and a stream buffer 220. The playback manager module 212 further comprises a file navigator object 2120.

Preferably, the file system module 208 is to provide playback manager module 212 a plurality of files recorded on the media with their file names and locations so that the playback console 210 can provide user to setting his favorite play lists according to the file name. Accordingly, the playback manager module 212 generates audio format play list, video format play list, and audio-video interlaced play list according to user settings. The file navigator object 2120 processes the play lists and classify them to appropriate navigation modules such as audio file navigator object 2122, video file navigator object 2124 and normal file navigator object 2026. The file navigator object 2120 can setting playing sequence in accordance with the audio play-list and video play-list in the playback manager module 212.

The presentation engine module 214 includes the audio scene state machine 2142, the video scene state machine 2144, and the normal scene state machine 2146. The command message sending from file navigator object 2120 can be dispatched to corresponding scene state machines such as audio scene state machine 2142, video scene state machine 2144, and normal scene state machine 2146 of the presentation engine module 214 according to the file formats.

The audio scene state machine 2142 has an audio play sequence having media files of audio data format provided by the audio navigator object 2122 to be played. The audio state machine receives commands from the audio navigator object to control presentation operations of audio data alone. Similarly, the video scene state machine 2144 has a video play sequence having media files of video data format provided by the video navigator object 2124 to be played. The video state machine also receives commands from the video navigator object to control the media files in the video play sequence presentation alone. The normal scene state machine can control audio-video interlaced format files presentation.

Both audio scene state machine 2142 and video scene state machine 2144 contain playing sequence settings. Hence, both state machines 2142, 2144 can be controlled independently or simultaneously by corresponding command message sending from file navigator object 2120. However, it does not include the normal scene state machine 2146.

The audio scene state machine 2142, video scene state machine 2144, are then in terms of parser module 216 putting the audio file and video file, respectively, to audio stream buffer 202 and video stream buffer 2204 for storage. The data in the stream buffer are waited for playing after parsing.

In a preferred embodiment of the present invention, the command messages that include "play", "stop", "pause", "previous", and "next" provided by the audio file navigator object 2122 are sent to audio scene state machine 2142 to process while playing file contain audio file only. Similarly, forgoing command messages provided by video file navigator object 2124 will be sent to the video scene state machine 2144 while playing file contain video file only and provided by normal file navigator object 2124 will be sent to the normal scene state machine 2146.

In response to user's operation, the presentation engine module 214 will respond a job request message and be loaded by the loader manager module 206. A loader job, which is in response to the job request message is then generated by the loader manager module 206. The job request message contains the beginning address and ending address of the playing file recorded on the media 400 and playing sequence. The playing sequence depends on usage status, priority, and an examination function. The examination function is a return code provided for loader manager module 206 according to the free space in the stream buffer. In order to avoid audio playing or video playing being individually interrupted due to data in stream are depleted, an examination function is designed. In other words, to make sure there always have data in audio stream or video stream buffer. Accordingly, examination function can be classifies into three states including "C", "M", and "F". The "C" represent the data in stream buffer is critical. The "M" represent the data in stream buffer is middle and the "F" represent the data in stream buffer is full. A loader job table contains the job requests, state, priority, and examination function wherein examination function is optional and the state reports the job request is in used state or unused state. Of which job requests is loaded by the job loader module 204 is in according with the priority order. Generally, the first job request will be tagged with the first priority and the second one will be tagged with the second priority. The follows are tagged with the priorities according to the time job requests in. However, if a job request contains an examination function and the examination function shows the data in stream buffer is critical then its executing priority will be elevated to the first one.

For instance, in FIG. 3, a loader job table having three job requests 1, 2, and 3 listed is waiting for loading. The executing priority of job requests 1, 2, 3 depends on the time of job request. The earlier job request has a higher priority. The job requests 1, 2 have not an examination function therein. Thus the executing priorities are not changed. However, the job request 3 having an examination function "C", which gives a message that data in stream buffer is critical. To avoid playing being interrupted owe to data depleted, thus, the priority of the job request 3 will be elevated. The updated executing priorities for job requests 1, 2, and 3 will become 2, 3, and 1. The priority in the loader job table will be updated after several sectors such as 8 or 16 sectors of a playing file are played according to the examination function's return call.

The file system module 208 manages the file allocation table and provides file locations according to files supplied by the file navigator object 2120. While the presentation engine 214 generates job request message, the job loader manager module 206 generate the job loader table which has a playing sequence according to the priorities of job request messages. The loader module 204 then loads the job candidate having the first priority from medium into track buffer 218 by reading the sectors on the medium. The track buffer 218 belongs to be readable and writable memory, typically, DRAM.

In another preferred embodiment, the mix mode multimedia player includes audio stream buffer 2202 and video stream buffer 2204. The available free space of the audio stream buffer 2202 is preferably larger than the summation of audio data volume in the track buffer 218 and the maximum capacity of audio data that a parser module 216 can processed. The object is to make sure audio and video data being controlled individually and do not disturb each other. Similarly, the available free space of the video stream buffer 2204 is preferably larger than the summation of video data volume in the track buffer 218 and the maximum capacity of video data that a parser module 216 can processed. Thus, once upping one media file (video, or audio) is forced to be stopped or paused, the media file data stored in the track buffer 218 can be put to the corresponding stream buffer by parser module 216 so that the other type media file data will not be block out.

According to the above, the present invention has at least the following advantages.

1. The media file (video or audio data) can be independently scheduled according to user favorite.
2. The playing of the media file can be individually forced to pause, without disturbing the other one.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded the broadest interpretation so as to encompass all such modifications and similar structure.

What is claimed is:

1. A mix mode multimedia playback system, comprising:
a playback manager module for generating audio-format play list, video-format play list, and audio-video interlaced-format play list according to user settings, said user settings including a plurality of media file's names of which a user desires to play;
a presentation engine module having an audio scene state machine and a video scene state machine, wherein said presentation engine module provides corresponding play sequences to said audio scene state machine and said video scene state machine, furthermore, wherein said audio scene state machine plays said media files with audio format and simultaneously said video scene state machine plays said media files with video format, in response to said media files with audio format playing being forced to "stop" or "pause", said video scene state machine playing said media files with video format is not disturbed, in response to said media files with video format playing being forced to "stop" or "pause", said audio scene state machine playing said media files with audio format is not disturbed; and a track buffer for storing said media files, wherein said media files with audio format is moved from the track buffer to a audio stream buffer in response to said media files with audio format playing being forced to "stop" or "pause", and wherein said media files with video format is moved from the track buffer to a video stream buffer in response to said media files with video format playing being forced to "stop" or "pause", wherein available free space of said audio stream buffer is larger than summation of volume of said media files with audio format stored in said track buffer and maximum capacity of said media files with audio format processed by a parser module.

2. The mix mode multimedia playback system according to claim 1, further comprises a normal scene state machine for presenting those media file having audio-video interlaced format.

3. The mix mode multimedia playback system according to claim 1, further comprises file navigator object for saving play sequence of user settings.

4. The mix mode multimedia playback system according to claim 3, wherein said file navigator object generates an audio file navigator object, a video file navigator object and a normal file navigator object for saving said audio play sequence, video play sequence, and audio-video play sequence having audio-video interlaced data format of user settings.

5. The mix mode multimedia playback system according to claim 1, wherein said audio scene state machine receives commands including "play", "stop", "pause", "previous", and "next" from said audio file navigator object in order to control said audio play sequence.

6. The mix mode multimedia playback system according to claim 1, wherein said video scene state machine receives commands including "play", "stop", "pause", "previous", and "next" from said video file navigator object in order to control said video play sequence.

7. The mix mode multimedia playback system according to claim 1, wherein said normal scene state machine receives commands including "play", "stop", "pause", "previous", and "next" from said normal file navigator object in order to control said audio-video play sequence.

8. A mix mode multimedia playback system, comprising:

a playback manager module for generating audio-format play list, video-format play list, and audio-video interlaced-format play list according to user settings, said user settings including a plurality of media file's names of which a user desires to play;

a presentation engine module having an audio scene state machine and a video scene state machine, wherein said presentation engine module provides corresponding play sequences to said audio scene state machine and said video scene state machine, furthermore, wherein said audio scene state machine plays said media files with audio format and simultaneously said video scene state machine plays said media files with video format, in response to said media files with audio format playing being forced to "stop" or "pause", said video scene state machine playing said media files with video format is not disturbed, in response to said media files with video format playing being forced to "stop" or "pause", said audio scene state machine playing said media files with audio format is not disturbed; and a track buffer for storing said media files, wherein said media files with audio format is moved from the track buffer to a audio stream buffer in response to said media files with audio format playing being forced to "stop" or "pause", and wherein said media files with video format is moved from the track buffer to a video stream buffer in response to said media files with video format playing being forced to "stop" or "pause", wherein available free space of said video stream buffer is larger than summation of volume of said media files with video format stored in said track buffer and maximum capacity of said media files with video format processed by a parser module.

\* \* \* \* \*